United States Patent Office 3,549,497
Patented Dec. 22, 1970

3,549,497
MICROBIOLOGICAL PROCESS FOR ESTROGENS
Dieter Kluepfel, 5600 Raymond, Pierrefonds, Quebec, Canada, and Claude Vezina, 11 St. Sulpice, Oka, Quebec, Canada
No Drawing. Filed Dec. 5, 1967, Ser. No. 687,987
Int. Cl. C07c 167/14
U.S. Cl. 195—51        2 Claims

ABSTRACT OF THE DISCLOSURE

There is disclosed herein a process for the microbiological preparation of estrogens, in particular equilin, equilenin, and their respective dihydro derivatives, by incubating androsta-1,4,7-triene-3,17-dione with growing cultures of certain species of Actinomycetales, of Eubacteriales, and of moulds, and isolating the respective estrogens.

This invention relates to a microbiological synthesis of estrogens, in particular equilin, equilenin, and their respective dihydro derivatives, all of which are known to be highly active, naturally occurring estrogens. It is a particular advantage of the process of this invention that it permits the obtention of powerful estrogens from an easily available starting material.

More specifically, we prefer to use as starting material the compound androsta-1,4,7-triene-3,17-dione, obtained as described in Bowers et al. U.S. Pat. No. 3,067,212, issued Dec. 4, 1962. The latter compound, when incubated with growing cultures of certain species of Actinomycetales, of Eubacteriales, and moulds yields mixtures of equilin, equilenin, and their respective dihydro derivatives. The latter mixtures may be separated into their individual constituents by conventional means, such as, for example, chromatography, and the desired estrogen may be isolated in the pure state. Preferred species of Actinomycetales include *Streptomyces erythreus, Streptomyces microflavus, Streptomyces rimosus, Streptomyces fradiae, Streptomyces halstedii, Streptomyces roseochromogenes, Streptomyces olivaceus, Nocardia corallina, Nocardia asteroides, Nocardia erythropolis*. Preferred species of Eubacteriales include *Bacterium cyclooxidans, Bacillus coagulans, Micrococcus flavus,* and *Corynebacterium simplex*. Preferred species of molds include *Circinella umbellata, Didymella lycopersici, Absidia coerulea, Cunninghamella elegans,* or *Aspergillus sclerotiorum*.

The above microorganisms are grown in a medium containing a source of carbohydrate, such as, glucose, a source of nitrogen such as a casein hydrolysate, yeast extract, or peptone, and inorganic salts, for periods of time of from 24–72 hours, at temperature of from 20–30°C.

Preferred strains of the above microorganisms are *Streptomyces erythreus* NRRL–3260, *Streptomyces microflavus* NRRL–3261, *Streptomyces rimosus* NRRL–3259, *Streptomyces fradiae* ATCC 10745, *Streptomyces halstedii* ATCC 13449, *Streptomyces roseochromogenes* ATCC 13400, *Streptomyces olivaceus* ATCC 3335, *Nocardia corallina* ATCC 13259, *Nocardia asteroides* ATCC 8674, *Nocardia erythropolis* ATCC 17895, *Bacterium cyclooxidans* ATCC 12673, *Bacillus coagulans* NRRL B–3257, *Micrococcus flavus* NRRL B–3258, *Corynebacterium simplex* ATCC 19140, *Circinella umbellata* NRRL–3257, *Didymella lycopersici* ATCC 11847, *Absidia coerulea* ATCC 1359c, *Cunninghamella elegans* ATCC 10028a, and *Aspergillus sclerotiorum* NRRL 415.

The following examples will illustrate our invention.

EXAMPLE 1

A culture of *Streptomyces erythreus* NRRL–3260 maintained on nutrient agar medium is transferred into ten Erlenmeyer flasks, each containing 50 ml. of the following medium:

| | Gr. |
|---|---|
| Dextrose | 1.5 |
| Yeast extract | 1.5 |
| Peptone | 5 |
| $KH_2PO_4$ | 3.5 |
| Tap Water 1000 ml. | |

The pH of the medium is adjusted to 7.0 with 1 N sodium hydroxide.

The cultures are incubated at 25° C. on a rotary shaker. After 60 hours of incubation, 10 mg. of androsta-1,4,7-triene-3,17-dione in ethanolic solution is added to each flask. After an additional 30 hours of incubation at 25° C. the fermentation is stopped and the broth extracted twice with an equal volume of chloroform. The combined chloroform extracts are evaporated to dryness and the residue redissolved in a small volume of ethanol. This solution is chromatographed on thin layers of silica gel with a mixture of ethyl acetate and benzene (3:7) as solvent system. The mixture of estrogenic transformation products is isolated in this manner, and is separated into the individual estrogens by column chromatography. For analytical purposes, the separation of this mixture into equilin, equilenin and their respective dihydro derivatives is achieved by thin layer chromatography on silica gel, using a mixture of triethylamine-isopropyl ether and toluene (15:7.5:77.5) as solvent and comparing the spots with the pure standard compounds. Further proof of the identity of equilin and equilenin is obtained by gas chromatography.

In the same manner, when using, *Streptomyces microflavus, Streptomyces rimosus, Streptomyces fradiae, Streptomyces halstedii, Streptomyces roseochromogenes, Streptomyces olivaceus, Nocardia corallina, Nocardia asteroides, Nocardia erythropolis, Bacterium cyclooxydans, Bacillus coagulans, Micrococcus flavus,* or *Corynebacterium simplex,* instead of *Streptomyces erythreus,* equilin, equilenin, and their respective dihydro derivatives are also obtained.

EXAMPLE 2

A culture of *Circinella umbellata* NRRL–3257 is propagated on agar nutrient medium and transferred into ten Erlenmeyer flasks, each containing 50 ml. of the following medium:

| | G. |
|---|---|
| Glucose preparation ("Cerelose") | 50 |
| Casein hydrolysate ("Edamine") | 20 |
| Cornsteep liquor | 3 |
| Tap water 1000 ml. | |

The pH of the medium is adjusted to 5.8.
The cultures are incubated at 25° C. on a rotary shaker. After 60 hours of incubation, 10 mg. of androsta-1,4,7-triene-3,17-dione in ethanolic solution is added to each flask. After an additional 30 hours of shaking at 25° C., the fermentation is stopped and the broth extracted twice with an equal volume of chloroform. The combined chloroform extracts are evaporated to dryness, and the residue is dissolved in a small volume of ethanol. It is washed up in the same manner as described in Example 1, and *equilin, equilenin,* and their respective dihydro derivatives are obtained.

In the same manner, when using *Didymella lycopersici* ATCC 11847, *Absidia coerulea* ATCC 1359c, *Cunninghamella elegans* ATCC 10028a, and *Aspergillus sclerotiorum* NRRL 415, instead of *Circinella umbellata* NRRL–3257, equilin, equilenin, and their respective dihydro derivatives are also obtained.

We claim:
1. The process of preparing useful estrogens including equilin, equilenin and their respective dihydro derivatives from androsta-1,4,7-triene-3,17-dione which comprises subjecting said compound to incubation with a growing culture of a microorganism selected from Actinomycetales, Eubactenales, and moulds in a nutrient medium including nutrients for said microorganism and isolating said useful estrogens thus produced.

2. The process as defined in claim 1 wherein the microorganism is one selected from the group which consists of Streptomyces erythreus, Streptomyces microflavus, Streptomyces rimosus, Streptomyces fradiae, Streptomyces halstedii, Streptomyces roseochromogenes, Streptomyces olivaceus, Nocardia corallina, Nocardia asteroides, Nocardia erythropolis, Bacterium cyclooxidans, Bacillus coagulans Micrococcus flavus, Corynebacterium simplex, Circinella umbellata, Didymella lycopersici, Absidia coerulea, Cunninghamella elegans and Aspergillus sclerotiorum.

References Cited
UNITED STATES PATENTS

| | | | |
|---|---|---|---|
| 3,067,212 | 12/1962 | Bowers et al. | 195—51 (A3135) |
| 3,272,847 | 9/1966 | Irvine et al. | 195—51 (A3135) |
| 3,386,890 | 6/1968 | Vezina et al. | 195—51 (A3135) |

ALVIN E. TANENHOLTZ, Primary Examiner

PO-1050
(5/69)

UNITED STATES PATENT OFFICE
CERTIFICATE OF CORRECTION

Patent No. __3,549,497__   Dated __December 22, 1970__

Inventor(s) __Dieter Kluepfel and Claude Vezina__

It is certified that error appears in the above-identified patent and that said Letters Patent are hereby corrected as shown below:

Below the title and before the body of the specification, insert

--assignors to American Home Products Corporation, New York, N. Y., a corporation of Delaware--

Column 3, Claim 1, line 7,
change "Eubactenales" to --Eubacteriales--

Signed and sealed this 17th day of August 1971.

(SEAL)
Attest:

EDWARD M. FLETCHER, JR.
Attesting Officer

WILLIAM E. SCHUYLER,
Commissioner of Paten